United States Patent [19]
Kockott

[11] 3,797,918
[45] Mar. 19, 1974

[54] OPTICAL APPARATUS WITH SPECTRAL FILTERS FOR TESTING FASTNESS OF COLORS

[76] Inventor: Dieter Kockott, Dammstrasse 11, D6451 Ruckingen, Germany

[22] Filed: Oct. 12, 1971

[21] Appl. No.: 188,567

Related U.S. Application Data
[63] Continuation-in-part of Ser. No. 5,554, Jan. 26, 1970.

[52] U.S. Cl............... 350/269, 73/432 SD, 240/1.1, 356/256
[51] Int. Cl................................................ G02f 1/30
[58] Field of Search ........ 73/150, 432 SD; 350/266, 350/269, 271, 273, 275, 317; 240/1.1

[56] References Cited
UNITED STATES PATENTS

| | | | |
|---|---|---|---|
| 3,355,982 | 12/1967 | Rendina | 240/1.1 X |
| 3,334,217 | 8/1967 | Bickler et al. | 350/311 UX |
| 3,188,218 | 6/1965 | Elmer et al. | 240/1.1 X |
| 3,426,590 | 2/1969 | Suga | 73/150 |
| 1,818,687 | 8/1931 | Buttolph | 73/150 |

*Primary Examiner*—Ronald L. Wibert
*Assistant Examiner*—Paul K. Godwin
*Attorney, Agent, or Firm*—Weiner, Basile and Weintraub

[57] ABSTRACT

Apparatus and method for obtaining a detectable variation in a sample in response to radiation. The apparatus includes a source of radiation and a sample to be tested. Filters and a moveable shading device are disposed between the source of radiation and the sample to provide for irradiating different portions of the sample with radiation of the same light intensity per unit time to study the influence of different wavelengths on a sample. The apparatus enables one to determine the minimum wavelength which will bring about a degradation or disintegration of the sample under test.

4 Claims, 4 Drawing Figures

OPTICAL APPARATUS WITH SPECTRAL FILTERS FOR TESTING FASTNESS OF COLORS

CROSS-REFERENCE TO RELATED APPLICATION

The present application is a continuation-in-part application to co-pending U.S. Pat. application Ser. No. 5,554 filed Jan. 26, 1970 now abandoned, entitled "Optical Radiation Apparatus for Determining the Minimum Wavelength."

The present invention relates to an apparatus and a method for obtaining a detectable variation in the sample in response to radiation. In one particular embodiment of the invention, there is provided an optical radiation apparatus to achieve a visible or otherwise detectable radiation degradation or disintegration of materials, such as color samples, various paints, varnishes, synthetic plastics and the like, and other materials.

BACKGROUND OF THE INVENTION

The purpose of the present invention is to attain a simple measuring method in order to determine the light fastness of various materials, and to receive quickly quantitative results of the light fastness of the tested materials or samples with little or no wasting of time. A characteristic parameter for testing the light fastness of a material or sample is the minimum wavelength which causes degradation or disintegration of the material being tested. The mentioned minimum wavelength is defined by the fact that for all wavelengths smaller than, or equal to the minimum wavelength absorption processes take place in the irradiated material or sample which produce visible or otherwise detectable alterations, e.g., decolorations, yellowing, or changes in the mechanical properties of the material or sample under test.

For different degradation or disintegration processes there may exist various minimum wavelengths. The shorter the minimum wavelength, the greater is the fastness to light of the material or sample.

There are some apparatus which are already known for testing light fastness and the capability of resisting weather influences of various materials. The mentioned known apparatus include a centrally located light or radiation source and means to produce extreme weather conditions. The light or radiation source simulates, with its sunlike spectrum, the daylight. With the known apparatus, the energy per unit time of irradiation to the sample is considerably greater than that which occurs in daylight, so that the samples undergo quicker alterations than would occur with the radiation with natural daylight.

In addition to the aspired time shortening, there is of interest the question of the reason for the material change in the irradiated sample in order to undertake appropriate measures to improve the material being tested. Each material has the characteristic of manifesting degradation or disintegration to a minimum wavelength.

Certain testing apparatus of a known type, which include a combination of irradiation apparatus and weather equipment, effect a change in the material being tested without answering the question; which wavelength of the spectrum causes such change? Furthermore, with the known testing apparatus, it is not possible to separate from each other degradation caused by irradiation and that caused by the weather equipment.

There are other known testing apparatus which make possible the measurement of one or more minimum wavelengths of a material. These testing apparatus concern laboratory devices which have great optical resources and permit a very exact measurement of the minimum wavelength. For industrial purposes, the knowledge or determination of the minimum wavelength with a high degree of accuracy is not necessary, so that the great resources of these testing apparatus represent a disadvantage. Up to the present time, the known testing devices for the determination of the minimum wavelength with a high degree of accuracy also possess the disadvantages of requiring high technical resources and considerable loss of time, whereby the requirement of time shortening for the measurement is not attained.

It is accordingly a primary object of the present invention to provide a method and an optical radiation apparatus for radiation degradation which makes it possible, without any excessive technical resources, to determine the material constant, viz., the minimum wavelength which causes degradation or disintegration, which is determinitative of the light fastness.

SUMMARY OF THE INVENTION

The present invention provides an apparatus for obtaining a detectable variation in a sample in response to radiation. The apparatus includes a source of radiation and a sample to be tested. The apparatus also includes a wedge or interference sky filter, including at least one filter element, and a moveable shading means which has different formed slots. The filter and shading means are disposed between the source of radiation and the sample to be tested for irradiating different portions of the sample with radiation of different wavelengths.

The present invention also provides a method for using the novel apparatus for obtaining a detectable variation in a sample in response to radiation including the following steps. The sample to be tested is disposed in proximity to a source of radiation. The interference filter or cut-on filters, including at least one filter element, is disposed between the source of radiation and the sample to be tested for irradiating the different portions of the sample with radiation of different wavelengths. A moveable shading means having a plurality of slots therein is disposed between the interference filter and the sample. Then, the variation in the sample under test is detected in response to the radiation with different wavelengths, for example, to determine the minimum wavelength which brings about the mentioned variation or degradation in the sample.

According to the present invention, there is also provided an optical radiation apparatus for the irradiation of the sample along its linear extension with radiation of different wavelengths.

In certain embodiments of the present invention, there is provided a radiation apparatus for the fanning of a continuous spectrum of a radiation source into wavelengths preferably by an interference sky filter and a moveable shading means alternatively, a cut-on filter can replace the interference sky filter. Throughout this application, the mentioned cut-on filters are sometimes referred to as wedge filters, stage filters, step filters or spectral band filters. The sample and sample support are provided in a fixed or predetermined position relative to the interference sky filter or the cut-on filters.

The invention also provides an optical radiation apparatus including samples provided with a raster, wherein the markings of the raster are coordinated relative to the spectral transmittance of the interference sky filter, or to the absorption edges or bands of the spectral band filters, respectively.

Furthermore, the present invention makes it possible to fan or alter a continuous spectrum into various wavelengths, whereby it is possible to determine the minimum wavelength which caused degradation or disintegration of a material. In addition to the fact that the measurement is effected with few technical resources and with great economy of time, another advantage is offered by the availability of a quick preliminary examination of detailed testing processes with regard to various material properties. For subsequent examinations, only such a radiation source is needed which comprises the spectrum field previously separated during, or by the measurement of the minimum wavelength.

In order to determine the light fastness of a material and its spectral sensitivity, it is important that within all wavelength bands an equal number of quanta per unit time impinges upon the sample. Only then is it possible to compare correctly the degree of damage or degradation caused by different wavelengths. There are two practical ways of making such a comparison. Either the comparison is effected by calculation, or by the spectral distribution of the radiation sources by the use of intermediate filters. Additional radiation sources can be used in spectrum ranges of low emission of a xenon lamp, for example, a low pressure mercury lamp with a flourescent substance. Thus it is possible to meet, at least partially, the above-mentioned requirement.

By the intermediate positioning of a moveable shading means between the interference sky filter, or the cut-on filter and the sample to be tested, the optical density thereof is varied in a longitudinal direction in such a manner that the different emission of the radiation source in the various spectral bands and the different absorption factor of the interference sky filter or cut-on filter along its axis are such that the sample is irradiated at all wavelengths by an equal number of quanta per unit time.

DETAILED DESCRIPTION OF SOME PREFERRED EMBODIMENTS OF THE INVENTION

Figure 1:
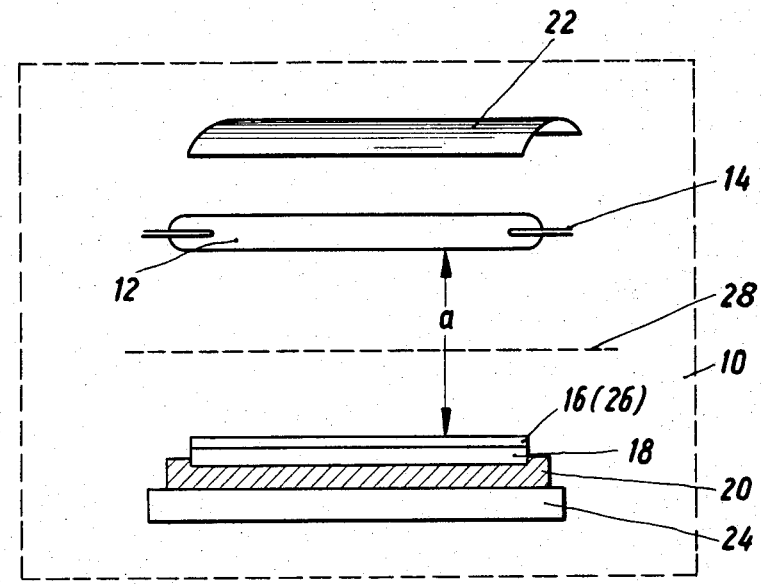
FIG. 1 illustrates schematically a first possible embodiment of the present invention.
Figure 1A:
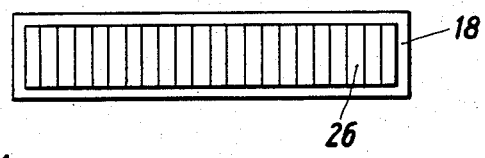
FIG. 1a illustrates a top plan view of the sample, a plurality of spectral band filters placed thereon, and the separation intervals between the markings of a raster placed on the sample.

With reference to FIG. 1, there is shown a radiation source, such as a xenon lamp, which emits a continuous spectrum. The radiation source 12 is arranged in a sample chamber 10 of a radiation apparatus for determining the minimum wavelength. The radiation source 12 is supplied with electric currents through conductors or connections 14. A semi-cylindrical, parabolic or eliptical mirror 22 which is disposed above the radiation source 12 reflects the upward irradiated light of the radiation source 12 towards a sample 18. Thus, the irradiation strength applied to sample 18 is increased.

In a first embodiment of the invention, a wedge or interference sky filter 16 is arranged at a predetermined distance $a$ from the radiation source 12 and disposed between the radiation source and the sample 18. The sample 18 to be tested consists, for example, of colors, paints, varnishes, synthetic plastic coatings, etc., and is placed on a sample support 20.

Before being irradiated, the sample 18 is provided with a stable or fixed raster for the purpose of marking the various wavelengths. The sample 18 and the sample support 20 are provided in a predetermined or stationary position relative to the interference sky filter 16, whereby the sample 18 abuts or lies against the interference sky filter 16.

In practice, the apparatus may be constructed in such a form as to be superimposed upon the material and thereby provide for testing of greater or extensive surfaces.

Referring again to FIG. 1, the sample support 20 rests upon a base support 24 which is swingable out of the sample chamber 10 to provide a quick and easy exchange of the samples 18. Prior to irradiation, the raster is placed in a length direction upon the sample 18 in such a way that the marks or lines of the raster are coordinated with the spectral transmittance of the interference sky filter 16.

If desired, a heat absorption filter 28 may be disposed between the radiation source 12 and the interference sky filter 16 and arranged to prevent an excessive heating of the sample 18. Also, if desired, the radiation apparatus may include a mechanism (not shown) for the automatic control of the humidity of the air and for the weathering of the sample 18 in the sample chamber 10. This mechanism may be provided as an additional equipment for samples whose degradation is sensitive to humidity, for example, varnishes.

There may be employed several wedge filter, cut-on or spectral band filters 26 which are marked out by a steep absorption edge instead of the interference sky filter 16, the spectral transmittance of which changes continuously over a length direction of the filter. The cut-on filter has a predetermined level of radiation absorption above which it will pass radiation having a wavelength greater than the predetermined level. Thus, below a wavelength $\lambda_k$, which is coordinated to the edge of the cut-on filter, all the radiation is absorbed; and for $\lambda > \lambda_k$ the transmittance is extremely high.

If, subsequent to irradiation, under a certain cut-on filter 26 second filter having a $\lambda_{K2}$ a change of the sample occurs, but which was not observed or noted in the case of a certain first filter $\lambda_{K1}$ then the minimum wavelength must be between the two $\lambda_k$ of the mentioned filters i.e., $\lambda_{K1}$ and $\lambda_{K2}$. In the case of a sufficiently dense sequence of the $\lambda_k$ it is possible to achieve a satisfactory precision in determining the minimum wavelength. The primary advantage offered by this process resides in the shorter testing time. Whereas in the case of the interference sky filter 16 only a very small wavelength band of the radiation impinges upon each point of the sample, and thus only a fractional portion is exposed to the radiation of the source. Whereas in the case of the cut-on or spectral band filters, an integration is achieved over all wavelengths $\lambda > \lambda_k$ and consequently a greater irradiation strength is applied to the sample.

Figure 2:
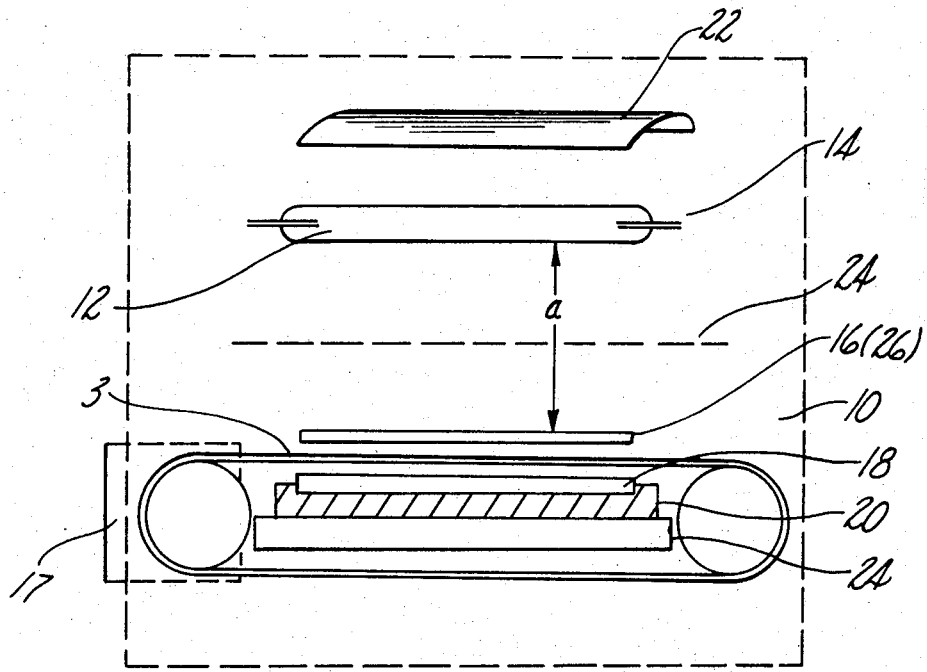
FIG. 2 illustrates schematically a second possible embodiment of the present invention utilizing a shading means.
Figure 3:
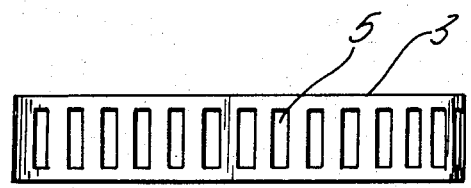
FIG. 3 illustrates the plurality of slots of the shading means.

With reference to FIG. 2, there is shown another embodiment of the present invention which utilizes a radiation source emitting a continuous spectrum. The radiation source 12 is arranged in a sample chamber 10 of the radiation apparatus for determining a minimum wavelength. The radiation source 12 is supplied with electric currents through conductors or connectors 14. A semi-cylindrical, parabolic or eliptical mirror 22 which is disposed above the radiation source 12 reflects the upward irradiated light of the radiation source 12 towards a sample 18.

In both the embodiments of FIG. 1 and FIG. 2, a sky interference sky filter 16 is arranged at a predetermined distance $a$ from the radiation source 12 and disposed between the source 12 and the sample 18. The sample 18 to be tested consists, for example, of colors, paints, varnishes, plastic coatings, etc., and is places on a sample support 20.

Before being irradiated, the sample 18 is provided with a stable or fixed raster for the purpose of marking the various wavelengths. The sample 18 and the sample support 20 are provided in a predetermined or stationary position relative to the interference sky filter 16, whereby the sample 18 is spaced apart of the interference sky filter 16. The moveable shading means 3 having the plurality of spaced apart slots 5 disposed therein is placed between the interference sky filter 16 and the sample 18.

In practice, the apparatus may be constructed in such a manner as to be superimposed on the material and thereby provides for testing of greater or extensive surfaces.

Referring to FIG. 2, the smaple support 20 rests upon the base support 24 which is swingable out of the sample chamber 10 to provide a quick and easy exchange of the samples 18. Prior to radiation, the raster is placed in a lengthwise direction upon the sample 18 in such a way that the marks or lines of the raster are co-ordinated with the spectral transmittance of the interference sky filter 16. The moveable shading means 3 may be driven by a motor 17 at a speed of 1 to 2 cycles per second past the sample 18.

If desired, a heat absorption filter 28 may be disposed between the radiation source 12 and the interference filter 16 and arranged to prevent an excessive heating of the sample 18. Also, if desire, the radiation apparatus may include a mechanism (not shown) for the automatic control of the humidity of the air or for the weathering of the sample 18 in the sample chamber 10. This mechanism may be provided as an additional piece of equipment when testing samples whose degradation is sensitive to humidity, for example, varnishes.

As with the first embodiment illustrated in FIG. 1, the embodiment of FIG. 2 may employ several cut-on or spectral band filters 26 which are marked out by a step absorption edge instead of the interference sky filter 16, the spectral transmittance of which changes continuously over a length in the direction of the filter.

In another embodiment which utilizes a wedge filter 26 in place of the interference sky filter 16, radiation from source 12 impinges on a certain first wedge or cut-on filter 26. This filter passes only a wavelength $\lambda_1$. The radiation $\lambda_1$ then impinges on the moveable shading means 3 which is translating passed the sample 18 at from 1 to 2 cycles per second. The plurality of slots 5 intermittently allow the radiation to pass through to impinge upon the sample 18. The slots 5 in the shading means 3 thereby assure that every point along the sample 18 receives a uniform radiation intensity per unit time impinging along the linear exterior of the entire sample to obtain a uniform degree of exposure of the entire sample.

Subsequently, the sample 18 is tested utilizing a certain second wedge or cut-on filter 26 which passes only a wavelength $\lambda_2$.

If a change of the sample occurs when testing using the second wedge filter 26, but no change in the sample was observed or noted when the sample was tested using the first wedge filter 26, then the minimum wavelength which causes disintegration or degradation ust lie between the minimum wavelengths passed by the respective filters, i.e., $\lambda_2$ and $\lambda_1$.

The advantage offered by this process and apparatus resides in a shorter testing time, and also in the fact that the entire sample is exposed to the same light intensity per unit time which results in comparable conditions on the sample 18 making it possible to study the influence of different wavelengths on the sample being tested. If the shading means 3 is not used, both factors involving sample degradation or disintegration, namely, different wavelengths and different intensities per unit time are superimposed and not separable making it impossible to determine if the effect at comparable points on the sample is the result of only a wavelength of the radiation or the result of different light-intensities.

The width, spacing, and form of the slots 5 in the shading means 3 is a function of the wavelengths of the radiation source used and is determined experimentally.

I claim:

1. An apparatus for obtaining a visible or otherwise detectable variation or radiation degradation in a sample in response to radiation, comprising, in combination:

a source of radiation disposed within said apparatus;
    said sample to be tested is disposed within said apparatus stationary relative to said source of radiation;
    a wedge filter disposed between said source of radiation and said sample to be tested, said wedge filter having a predetermined level of radiation absorption above which it will pass radiation having a wavelength greater than the predetermined level;
    a moveable shade means having spaced apart slots therein, said shade means being disposed between said wedge filter and said sample;
    a motor operatively associated with said moveable shade means to drive it past said sample to produce a uniform radiation intensity per unit time impinging along the linear exterior of said sample; and
    wherein said sample is irradiated with radiation passed by said wedge filter.

2. An apparatus as defined in claim 1, wherein a heat absorption filter is disposed between said source of radiation and said movable shade means.

3. An apparatus for obtaining a visible or otherwise detectable variation or radiation degradation, comprising in combination;

a source of radiation disposed within said apparatus;
    a sample to be tested disposed within said apparatus and being stationary relative to said source of radiation;
    an interference sky filter disposed between said source of radiation and said sample to be tested to separate said radiation into its component wavelengths;

a raster disposed over said sample to be tested having markings which are coordinated with the spectral transmittance of said sky filter;

a moveable shade means having spaced apart slots therein, said shade means being disposed between said interference sky filter and said sample;

a motor operatively associated with said moveable shade means to drive it cyclically past said sample to produce a uniform radiation intensity per unit time impinging along the linear extension of said sample; and wherein said sample is irradiated with radiation separated into its component wavelengths passed by said interference sky filter.

4. An apparatus as defined in claim 3, wherein said motor drives said movable shade means past said sample at a speed of from 1 to 2 cycles per second.

* * * * *